(12) United States Patent (10) Patent No.: US 8,814,063 B1
Millan (45) Date of Patent: Aug. 26, 2014

(54) SYSTEM, COMPONENTS AND METHOD FOR HYDRATING AND COOLING A CYCLIST

(76) Inventor: Luis A. Millan, Tucson, AZ (US)

( * ) Notice: Subject to any disclaimer, the term of this patent is extended or adjusted under 35 U.S.C. 154(b) by 536 days.

(21) Appl. No.: 13/028,981

(22) Filed: Feb. 16, 2011

Related U.S. Application Data

(60) Provisional application No. 61/338,143, filed on Feb. 16, 2010.

(51) Int. Cl.
*B05B 15/00* (2006.01)
*B05B 17/00* (2006.01)

(52) U.S. Cl.
USPC ............. 239/289; 239/154; 239/33; 222/175; 222/608; 222/610; 222/628; 224/148.2; 224/148.4; 224/414; 224/420; 280/288.4

(58) Field of Classification Search
USPC ............. 239/16, 33, 289, 154; 222/175, 610, 222/628, 608; 224/414, 420, 148.1–148.7; 280/288.4
See application file for complete search history.

(56) References Cited

U.S. PATENT DOCUMENTS

| 4,815,635 | A | * | 3/1989 | Porter | 222/136 |
| 4,911,339 | A | * | 3/1990 | Cushing | 222/610 |
| 5,119,978 | A | * | 6/1992 | Kalamaras et al. | 224/414 |
| 5,497,920 | A | * | 3/1996 | Moeller et al. | 224/414 |
| 5,645,404 | A | * | 7/1997 | Zelenak | 417/1 |
| 5,735,440 | A | * | 4/1998 | Regalbuto | 222/610 |
| 6,666,360 | B1 | * | 12/2003 | Swank | 224/148.2 |

* cited by examiner

*Primary Examiner* — Dinh Q Nguyen

(57) ABSTRACT

A new and useful system, method and components are provided, for hydrating and cooling a cyclist, in a manner that is efficient and effective, and in a manner that minimizes disruption of the cyclists attention to his/her riding. The components and system include a liquid container connected to a portion of a cycle and hydrating and actuating components that use the liquid (preferably water) in the liquid container. The liquid container has a body of liquid and the hydrating and actuating components include a drinking straw extending into the body of liquid, a spray device having a tube extending into the container with a spray head located outside the container, and an actuator mechanism comprising a pumping component in fluid communication with the liquid in the container and a hand actuated trigger mechanism located to be accessible to the hand of a cyclist. The pumping mechanism is actuated by the hand actuated trigger to draw liquid from the container to the pump and to pump the liquid to the spray head where it is sprayed on the cyclist.

2 Claims, 4 Drawing Sheets

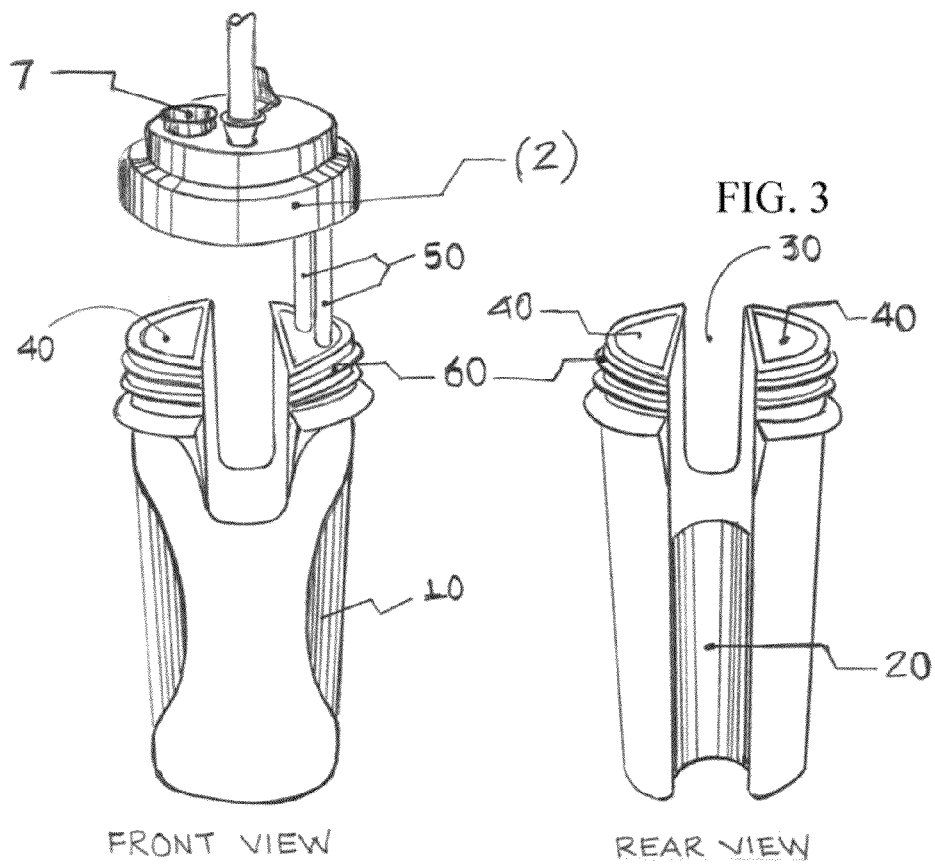

BROKEN VIEW

VIEW A-A'

ISOMETRIC

SYSTEM, COMPONENTS AND METHOD FOR HYDRATING AND COOLING A CYCLIST

RELATED APPLICATION/CLAIM OF PRIORITY

This application is related to and claims the priority of Provisional Application No. 61/338,143, filed Feb. 16, 2010, and entitled Oasis rider; and which provisional application is incorporated by reference herein.

BACKGROUND

Introduction and Summary of the Present Invention

The present invention relates to a new and useful system, method and components for hydrating and cooling a cyclist, in a manner that is efficient and effective, and in a manner that minimizes disruption of the cyclist's attention to his/her riding.

The present invention provides a system, system components and a method for hydrating and cooling a cyclist, e.g. a bicycle rider. The components and system include a liquid container connected to a portion of a cycle and hydrating and actuating components that use the liquid (preferably water) in the liquid container. The liquid container has a body of liquid and the hydrating and actuating components include a drinking straw extending into the body of liquid, a spray device having a tube extending into the container with a spray head located outside the container, and an actuator mechanism comprising a pumping component in fluid communication with the liquid in the container and a hand actuated trigger mechanism located to be accessible to the hand of a cyclist. The pumping mechanism is actuated by the hand actuated trigger to draw liquid from the container to the pump and to pump the liquid to the spray head where it is sprayed on the cyclist.

In a preferred embodiment, the liquid container and the hand actuated trigger are each connected at least partially with the handle bar of the cycle, so that they can be used and/or operated by a cyclist with relatively minimal disruption of the cyclist's attention to his/her riding functions or surrounding environment. For example, the cyclist r can drink liquid through the straw, and/or operate the trigger mechanism to cool the cyclist by spraying the liquid at the cyclist while the cyclist remains attentive to his/her riding and to the rider's surrounding environment.

Other aspects of the present invention will become apparent from the following detailed description and the accompanying drawings and exhibits.

BRIEF DESCRIPTION OF THE DRAWINGS AND EXHIBITS

FIGS. 2-4 are schematic illustrations of the container for a system, components and method, according to the principles of the present invention;

Figure 1:
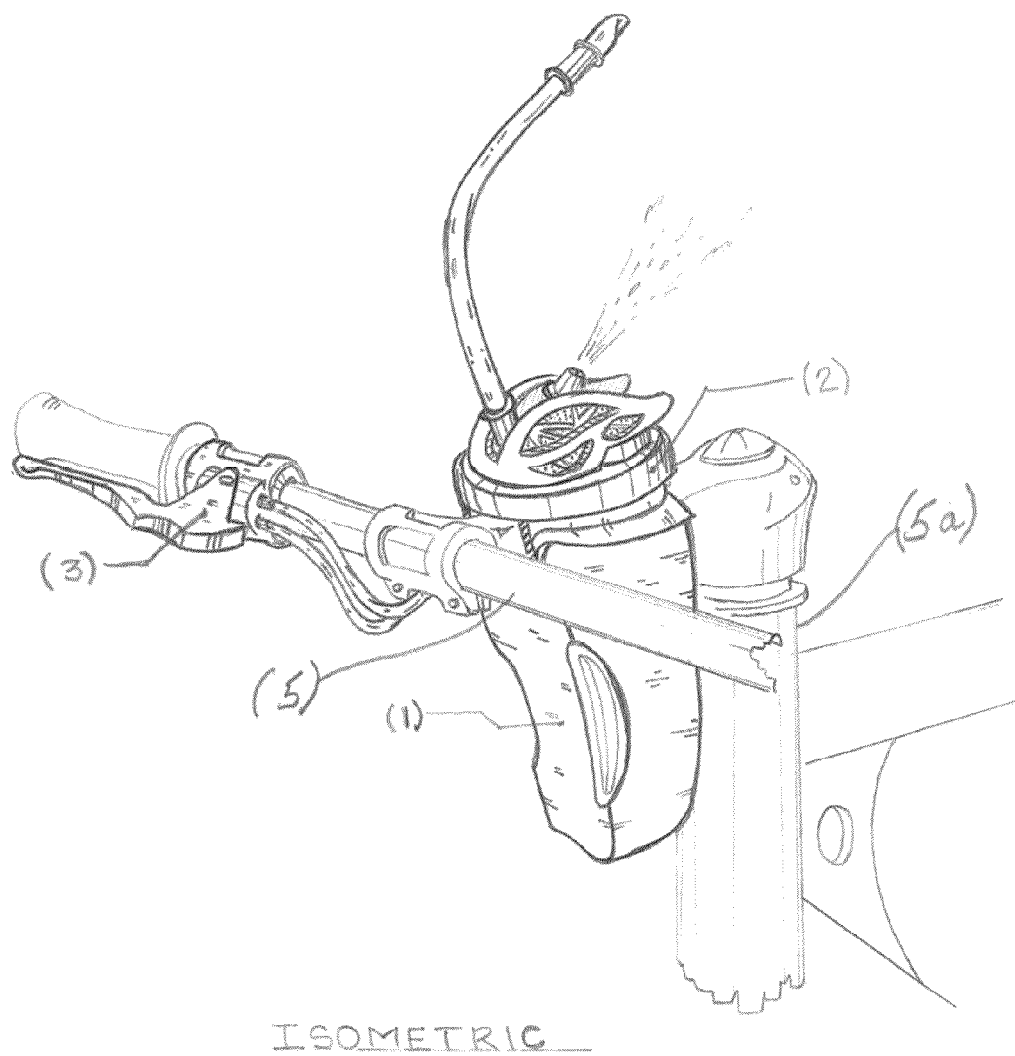
FIG. 1 is a schematic illustration of the system, including the system components, and the method by which liquid is used to cool a cyclist, according to the principles of the present invention.

Exhibit A is a copy of applicant's provisional application;

Exhibit B comprises schematic illustrations of a bicycle with a hydrating and cooling system, according to the principles of the present invention; and Exhibit C comprises illustrations of a prototype cycle with a hydrating and cooling system according to the embodiment of FIGS. 1-8.

DETAILED DESCRIPTION

As described above, the present invention relates to a new and useful system, method and components for hydrating and cooling a cyclist, in a manner that is efficient and effective, and in a manner that minimizes disruption of the cyclist's attention to his/her riding. The principles of the invention are described herein in connection with a bicycle, and from that description, the manner in which the principles of the invention can be applied to various types of cycles will be apparent to those in the art.

As illustrated in the figures, a system according to the invention includes a liquid container 1 connected to a portion of a cycle (preferably the handle bar 5 and the frame post 5a that engages the handle bar, and hydrating and actuating components, described below, that use the liquid (preferably water) in the liquid container. The liquid container has a body of liquid and the hydrating and actuating components include a drinking straw 70 extending into the body of liquid. a spray device having tubing (160, 170, 180) extending into the container with a spray head or nozzle 90 located outside the container, and an actuator mechanism comprising a pumping component 200 in fluid communication with the liquid in the container and a hand actuated trigger mechanism 190 located to be accessible to the hand of a rider. The pumping mechanism is actuated by the hand actuated trigger to draw liquid from the container to the pump and to pump the liquid to the spray head where it is sprayed on the cyclist.

The liquid container and the hand actuated trigger are each preferably connected to the handle bar 5 and the frame post 5a of the bicycle, so that they can be used and/or operated by a cyclist with relatively minimal disruption of the cyclist's attention to his/her riding functions or surrounding environment. For example, the cyclist can drink liquid through the straw 70, and/or operate the trigger mechanism 190 to cool the rider by spraying the liquid at the cyclist while the cyclist remains attentive to his/her riding and to the cyclist's surrounding environment The Installation of the System on a Cycle is as Follows:

The water container (1) is filled with fresh water, and then installed on the handle bar 5 of the cycle, by grabbing the container (1) with one hand and pushing up from the bottom of handle bar-post 5a, through the gap (30), placing the lid (2) on top of the container (1) and then tightening the lid by rotating the lower cap (130), making sure to insert rigid straws (50) on one side of intake (40). In addition, the container (1) can be filled through intake or fill opening (7) while the container is installed on the cycle.

The water trigger mechanism (3) is than installed, to right or left side of handle bar 5, using the clamp system (220) to hold it in place.

Once the container and water trigger mechanism are firmly secured to the handle bar 5 and handle bar post 5a, the system is primed by repeatedly squeezing trigger (190). This will cause siphoning of water from container (1) through straw (50), to tubing (180), to flexible tubing (230), to inside of pump housing (200). Once the system is primed, squeezing the trigger will cause water to be released out of trigger mechanism (3) to flexible tubing (240), and the water will travel through the tubing (170) and (150) until it reaches spray nozzle (90), where it will be expelled out in a breeze, spray or jet form The system is then operated on demand to the cyclist's first squeeze of the trigger mechanism. As will be clear to those in the art, this will cool the cyclist, in a way that does not require the cyclist to divert attention from his/her cycling.

To enable the cyclist to hydrate while operating the cycle, the system enables the cyclist to drink water directly from the container (10) via flexible straw (70). Loiting mouth piece (80) and suctioning, water will run from container (10), through rigid straw (50), to pipe (160), to base (140), then inside of flexible straw (70), until it has reached the mouth piece (80) and expelled out to cyclists mouth.

The system has a removeable adornment helmet (100) located on the container (a), whose function is to make the system more attractive and also to give more aerodynamic shape to the air flow that directs liquid from the spray nozzle 90. The helmet can come in a variety of shapes and colors. Also, as illustrated in Exhibit C, the spray nozzle can have a dial that enables the shape of the spray from the nozzle to be selectively controlled.

FIG. 1 is a schematic isometric illustration of the configuration and assembly of a system according to the present invention appropriated installed on bicycle's handle bar 5 and handle bar post 5a.

The system comprises three main parts: A water reservoir, or container, (1), a lid assembly (2), and a water trigger mechanism (3).

FIGS. 2, 3 and 4 illustrate details of the water reservoir (1). The water reservoir comprises is a refillable water container. It is designed with an ergonomic grip (10) for ease of handling (FIG. 2). The back of water container (1) is designed with a gap (20) that runs from top to the bottom of container (1). This gap (20) accommodates and secures the container (1) against the handle bar post 5a of the bicycle's frame. The top of the water container (1) is designed with a gap (30) that runs from front to rear side. This gap (30) helps to accommodate and secure the container (1) against the post 5a of the bicycle's handle bar.

The intake (40) located at the top of the water container (1) is divided by the gap (30), and the intake (40) is divided in two semi-circle portions. One portion of the intake (40) accommodates the pair of straws (50). The threads (60) are located at top of the water container (1) and are used to secure the lid assembly (2). Once the lid (2) is attached, it is secure and holds the water container (1) in place.

Figure 5:
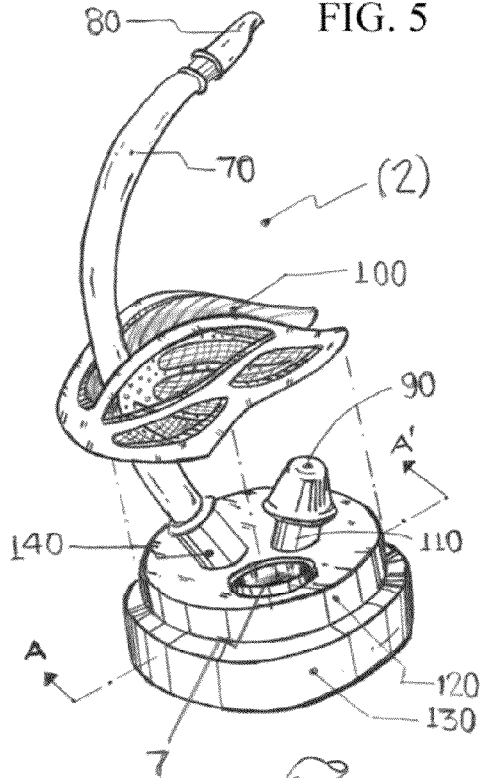
FIGS. 5-7 are schematic illustrations of the manner in which a cyclist is hydrated and cooled, according to the principles of the present invention.
Figure 6:
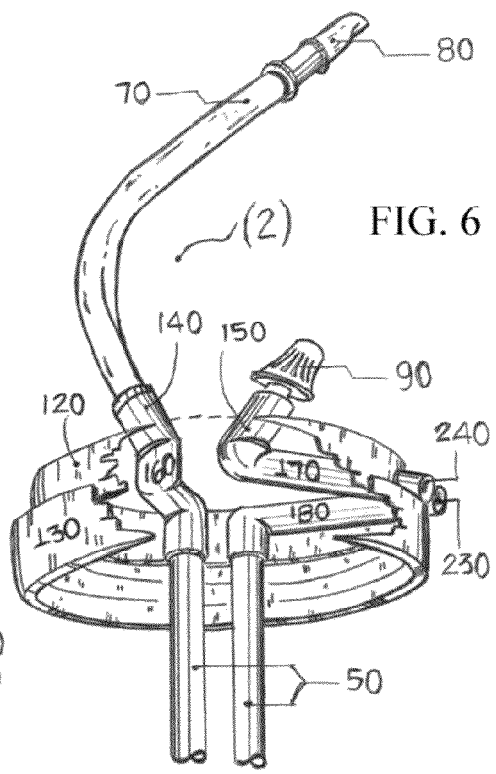
Figure 7:
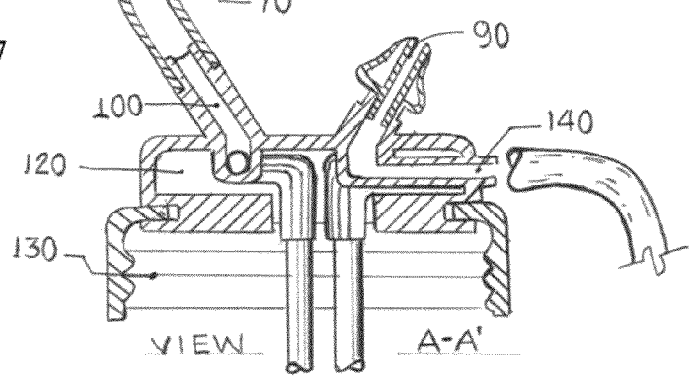

FIGS. 5, 6 and 7 further illustrate the lid or cap assembly: This unit comprises different elements including a flexible straw (70), mouth piece (80), adjustable spray nozzle (90), removable adornment helmet (100), adjustable spray nozzle base (110), upper cap and helmet base (120), lower rotary treaded cap (130), flexible straw base (140), outlet tubings (150), conduit tubing assembly (160, 170, 180), intake or fill opening (7), and rigid straws (50). Those components are assembled with and oriented relative to each other in the manner illustrated, and operate in the manner described herein.

Figure 8:
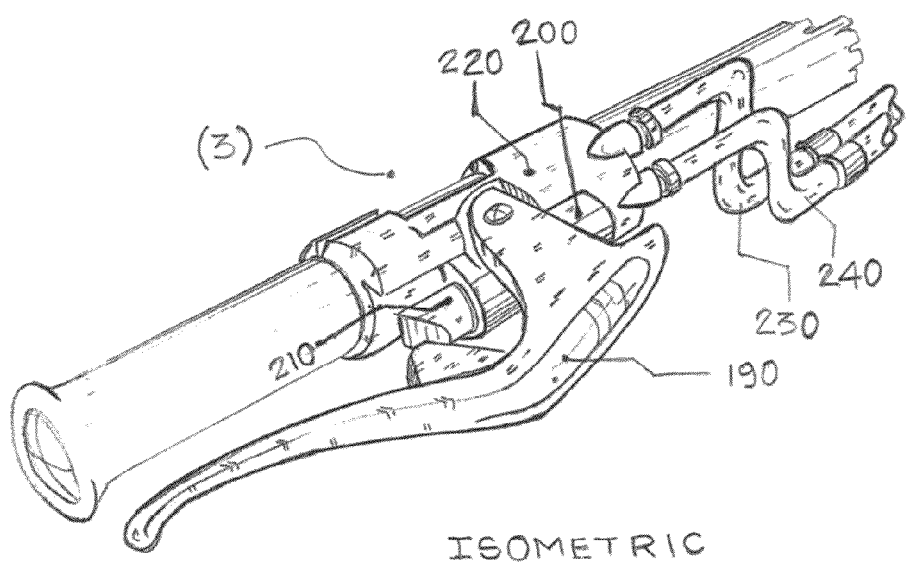
FIG. 8 is a schematic illustration of the trigger mechanism which initiates cooling of a cyclist, according to the principles of the present invention.

FIG. 8 further illustrates the water trigger mechanism (3): this unit is remotely located and is a hand activated water gun trigger, mounted for right or left hand application for easy squeezing. The trigger mechanism includes a trigger (190), pump chamber (200), piston (210), housing (220), flexible hose (230), and flexible hose (240), that are connected with each other in the manner illustrated, and operated in the manner described herein.

As will be clear from the foregoing description, with the container, lid and trigger mechanism assembled and connected with the cycle, in the manner described and illustrated, a cyclist can hydrate by drinking through the straw, and can initiate a cooling spray, by squeezing the trigger mechanism. Hydration and cooling can thus be accomplished while the cyclist remains attentive to his/her cycling and to the surrounding environment. Thus, both hydration and cooling can be effected with minimal disruption of the cyclists operation of the cycle.

Exhibits A and B show systems, components and the manner in which a method can be practiced, in accordance with the principles of the present invention, with the liquid container located in different places on a bicycle frame. With the locations shown in A and B, the container would not be as accessible for hydrating, but the principles by which the container and trigger mechanism would be useful for cooling a cyclist would remain, as will be clear to those in the art.

Exhibit C shows a prototype system and components, according to the schematic illustrations of FIGS. 1-8.

With the foregoing disclosure in mind, it is believed that various adaptations of a system, components and method for hydrating and cooling a cyclist, according to the principles of the present invention, will be apparent to those in the art.

The invention claimed is:

1. A method of hydrating and cooling a cyclist, comprising
   a. providing a liquid container connected to a portion of a cycle, the liquid container having
      1. a body of liquid and a drinking straw extending into the body of liquid,
      2. a spray device having a tube extending into the volume of liquid and a spray head located outside the container, a pumping mechanism in fluid communication with the liquid chamber and a hand actuated trigger mechanism accessible to the hand of a cyclist, the pumping mechanism configured to be actuated by the hand actuated trigger to draw liquid from the container and to pump the liquid to the spray head where it is sprayed on the cyclist, and
   b. cooling the cyclist by spraying the liquid at the cyclist when the cyclist actuates the trigger,
   wherein the cycle has a handle bar and a frame post that engages the handle bar, wherein the liquid container is partially connected to the frame post, and wherein the hand actuated trigger mechanism is connected to the handle bar, within reach of the cyclist whose hand is on the handle bar, and is oriented to be hand actuated by the cyclist while the cyclist maintains hand contact with the handle bar, and
   wherein the liquid container is configured to extend at least partially about the cycle frame post, and the hand operated trigger mechanism is clamped about a portion of the handle bar, and wherein the liquid container has a gap for receiving a portion of a handle bar post and has a lid that is tightened about the liquid container to capture the portion of the handle bar post between the liquid container and the handle.

2. The method of claim 1, wherein a helmet shaped device is located on the container, and is configured to shape the air flow that directs liquid from the spray head.

* * * * *